United States Patent
Saito et al.

(10) Patent No.: US 6,210,610 B1
(45) Date of Patent: *Apr. 3, 2001

(54) METHOD OF MANUFACTURING LENS, INJECTION MOLD FOR MOLDING OF LENS, AND MOLDED LENS

(75) Inventors: Kiyohiro Saito; Hiroshi Asami, both of Tokyo (JP)

(73) Assignee: Hoya Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,945

(22) PCT Filed: Jan. 17, 1997

(86) PCT No.: PCT/JP97/00078

§ 371 Date: Jul. 17, 1998

§ 102(e) Date: Jul. 17, 1998

(87) PCT Pub. No.: WO97/26124

PCT Pub. Date: Jul. 24, 1997

(30) Foreign Application Priority Data

Jan. 18, 1996 (JP) .................................................. 8-006407
Feb. 22, 1996 (JP) .................................................. 8-034749

(51) Int. Cl.$^7$ ..................................................... B29D 11/00
(52) U.S. Cl. ............................................................. 264/2.5
(58) Field of Search .................................... 425/568, 412, 425/256, 542, 808; 249/117, 160; 264/2.5, 225, 328.1, 328.6, 2.6, 1.1, 2.7, 219

(56) References Cited

U.S. PATENT DOCUMENTS

| | | |
|---|---|---|
| 4,184,835 | 1/1980 | Talbot . |
| 4,254,065 * | 3/1981 | Ratkowski ............................ 425/808 |
| 4,364,878 | 12/1982 | Laliberte et al. . |
| 4,793,953 * | 12/1988 | Maus ..................................... 264/2.5 |
| 4,828,769 | 5/1989 | Maus et al. . |
| 4,900,242 | 2/1990 | Maus et al. . |
| 5,137,441 * | 8/1992 | Fogarty ................................. 425/412 |
| 5,716,540 * | 2/1998 | Matiacio et al. ..................... 249/117 |

FOREIGN PATENT DOCUMENTS

| | | |
|---|---|---|
| 0 244 783 | 2/1991 | (EP) . |
| 54-148055 | 11/1979 | (JP) . |
| 61-6623 | 4/1986 | (JP) . |
| 1-275111 | 11/1989 | (JP) . |
| 1-291915 | 11/1989 | (JP) . |
| 5-44893 | 7/1993 | (JP) . |

OTHER PUBLICATIONS

George Galic's Letter to German Patent Agent dated Nov. 10, 1997 (2 pages); including an AFFIDAVIT to the European Patent Office dated Nov. 7, 1997 (7 pages).

SPIE–The International Society for Optical Engineering Reprinted from Ophthalmic Lens Design and Fabrication vol. 1529 –Dated Jul. 25–26, 1991 (Pages 13–21). Improved Plastic Molding Technology for Ophthalmic Lens & Contact Lens by George Galic and Steve Maus.

Optical World; Injection–compression moulding of Rx polycarbonate lenses by George Galic, October, 1991 (4 pages).

ENGEL Information; Sandwich Press Injection April, 1975 (10 pages).

* cited by examiner

Primary Examiner—George Manuel
(74) Attorney, Agent, or Firm—Flynn, Thiel, Boutell & Tanis, P.C.

(57) ABSTRACT

A gate top member 23 is placed to a gate 22 opened toward the circumferential edge of a molding spectacle-lens cavity 13 formed between inserts 11 and 12. The plural gate top members 23 each having a different height are previously prepared, and attached with a bolt to be exchanged. In pilot production, it is checked for each of various lenses which opening configuration of the gate 22 can form a spectacle lens with defined great-precision by exchanging the gate top member 23 in order to obtain each gate opening configuration changed by exchanging the gate top member 23.

24 Claims, 10 Drawing Sheets

1

METHOD OF MANUFACTURING LENS, INJECTION MOLD FOR MOLDING OF LENS, AND MOLDED LENS

TECHNICAL FIELD

This invention relates to a lens producing method for producing a lens of a spectacle lens or the like, an injection molding die for molding a lens which is used in the same and a lens molding.

BACKGROUND ART

Japanese Patent Application Publication No. Hei 5-30608 discloses an injection molding apparatus for molding a plastic spectacle lens. In the inside of an injection molding die in the injection molding apparatus, two cavities formed with tubular insert guides and inserts slidably inserted into the insert guides, a gate opened toward each cavity as an inlet port of a molten resin into the cavity, a runner connecting between the cavities through the gate, and a sprue connected to the central portion of the runner at the right angle are provided.

In order to mold the lens, first, the volume of the cavity is increased by moving the insert back in the insert guide. In this state, the molten resin is injected through an injection nozzle into the sprue. The molten resin injected into the sprue is fed through the runner and the gate into the cavity, and after feeding, the molten resin in the cavity is compressedly molded by moving the insert forward in the insert guide.

As a result, the plastic spectacle lens, having plural lens portions compressedly molded in the cavities, a runner forming portion formed by the runner to connect between the lens portions, and a sprue forming portion formed by the sprue to be connected to the runner forming portion, is obtained.

After then, the plastic spectacle lens molding undergoes a coating process with a coating fluid after a washing process with a cleaning fluid as after-treatment, thereby sufficient durability of the lens surface for the spectacle lens is obtained.

Various spectacle lenses can be molded in the aforementioned injection molding die by exchanging the inserts. The spectacle lens has various kinds of lens, such as a plus lens having the thinner peripheral portion than the central portion, a minus lens having the thicker peripheral portion than the central portion, a semi-finish lens having the sufficient thickness for preconditioning a following process for a concave surface of lens or a convex surface of lens and various lenses having the different diopter of the above lenses.

The spectacle lens having the diopter range of +4.00 Diopter to −8.00 is preferably used for the molding method.

The thickness of the lens is different dependent upon a design of an optical lens, for example, an aspherical lens, having approximate 1.50 of index of refraction, can be adjusted to designing values of 4.2 mm of the thickness of the central portion and 1.0 mm of the thickness of the peripheral portion in the case of +2.00 Diopter, and of 1.4 mm of the thickness of the central portion and 7.9 mm of the thickness of the peripheral portion in the case of 4.00 Diopter. However, when the above lenses are molded to be compressed under the same conditions, the following disadvantages are produced by the difference of a shape properties.

For example, in the molding of the minus lens, the central portion of the lens is thinner than the peripheral portion thereof, so that the central portion of the cavity has a large flow-resistance. Therefore, the molten resin injected into the cavity hardly flows in the central portion of the cavity, so that the resin flows around from the peripheral portion to the central portion by separately flowing, resulting in a disadvantage that a lot of weld marks are easily produced in the central portion.

Further, in the molding of the plus lens, when the difference between the volume of the cavity and the quantity of the fed molten resin is extremely big, the flow property of the molten resin is reduced, and naturally, a non-fed part is produced, with the result that a flow mark is easily produced on the lens after molding The spectacle lens is a precision molding, therefore, in order to mold each lens with a high power of precision, it is important that the molten resin is evenly and reliably fed into every corner of the cavity without remaining a feed history of the resin of the aforementioned weld mark, the flow mark and so on to correspond with each of various lenses. Therefore, a structure of the gate as an inlet port of the molten resin into the cavity is critical. As the gate structure having an opening area capable of ensuring the specified amount of feeding the molten resin for a specified time, for example Japanese Patent Application Publication No. Hei 5-44893 discloses.

However, the injection method for the lens having a different thickness between the central portion and the peripheral portion like a spectacle lens is difficult, especially, the plus lens has the thinner peripheral portion, so that a change in configuration including polymerization contraction, known as "molding sink", is produced adjacent to the gate, therefore the precision of the configuration of the peripheral portion is hardly retained. The gate opening configuration relates to the flow properties of the fed resin, so that the inferior feeding or the flow mark are easily produced in dependence on the gate opening configuration, for example, in the case the minus lens is molded, when the resin is not smoothly flown into the cavity, the weld mark has a propensity to be noticeably produced. Furthermore, for example, in the case of typical polycarbonate resin, excessive back-flow of the resin injected into the cavity once becomes a cause of easily producing a cut and deformation and a uneven flow history of the resin easily leaves an injection history on the surface of the lens. Therefore, the gate structure capable of obtaining the appropriate back-flow and the flow properties of the resin has been required.

In the case that the lens portion formed in the cavity for a molding is a plus lens having a meniscus-shape of the thicker central portion of the lens than the peripheral portion, it is thought that the injection molding is carried out by decreasing the size of the gate opening as a connection portion of the cavity and the runner. The reason is, as described above, that the back-flow in the peripheral portion is controlled and "molding sink" is hardly produced, because "molding sink" has the effect on the configuration accuracy of the thinner peripheral portion when the molten resin in the two cavities are compressedly molded with the movement (forward) of the insert for the insert guide.

When the gate opening is to be smaller, the back-flow is hardly produced in the compression molding by slidably moving the insert, but a void space as a lacked portion caused by shrinkage of the molten resin, which is different from "molding sink", is easily produced at the connection portion of the runner and the sprue, which has increased volume.

If the void space is produced on the plastic spectacle lens molding, in the washing process with the cleaning fluid and the coating process with the coating fluid as described above, the cleaning fluid remains in the concave void space, a white turbidity fluid is produced by reaction with the cleaning fluid remaining the void space and the coating fluid including an organosilicon compound and/or its hydrolysate, and the surface of the lens portion is stained with the white turbidity fluid, resulting in loss of commercial value of the spectacle lens.

As to the disadvantages described thus far, in the plus lens having a low-power lens diopter, the flow properties of the molten resin is not needed to be defined at high because of the small different thickness of the central portion and the peripheral portion of the lens, so that the temperature of the injection molding die is defined at low and the back flow of the molten resin is hardly produced, and when a non-astigmatic lens is molded as compared with molding an astigmatic lens, the difference of the thickness of the central portion and the peripheral portion of lens is larger, namely, the thickness of the peripheral portion is thinner, so that the gate opening is defined to be small, resulting in noticeable occurrence of the back flow.

It is an object of the present invention to provide the lens producing method and the injection molding die for molding the lens to be able to mold an accurate lens without influence of the lens configuration including the difference of the thickness of the central portion and the peripheral portion of the lens.

It is another object of the present invention to provide the lens producing method, the injection molding die for molding the lens and the lens molding, in which the occurrence of the void space is controlled, so that the white turbidity fluid is not produced by operating the washing process with the cleaning fluid and the coating process with the coating fluid.

DISCLOSURE OF THE INVENTION

In order to attain the aforementioned objects, a lens producing method, according to the present invention, for molding a required lens molding by solidifying a thermoplastic molten resin in a molding lens cavity which is formed in an injection molding die for molding a lens, in which the lens molding is molded by using the injection molding die for molding the lens, provided therein with the molding lens cavity in the injection molding die for molding the lens and a gate as an inlet port for the molten resin flown in the cavity to be opened toward the cavity, is characterized by the step of changing shapes of an opening configuration of the gate in response to molding of a minus lens having a thicker peripheral portion than a central portion thereof and molding of a plus lens having a inner peripheral portion than a central portion thereof.

According to the aforementioned lens producing method, the lens molding is molded by changing the gate opening configuration in the cases of molding the minus lens and the plus lens, so that the gate opening configuration can be selected to be suitable for the lens configuration of the minus lens or the plus lens, resulting in molding of the accurate lens without the influence of the lens configuration.

Another lens producing method, according to the present invention, for molding a required lens molding by solidifying a thermoplastic molten resin in a molding lens cavity, formed in an injection molding die for molding a lens, and by being operated upon a washing process with a cleaning fluid and a coating process with a coating fluid, in which the lens molding is molded by using the injection molding die for molding the lens, provided therein with the plural molding lens cavities in the injection molding die for molding the lens, a gate as an inlet port for the molten resin flown in the cavity to be opened toward the cavity, and a runner connecting between the plural cavities through the gate, and a sprue connected to the runner, it is characterized by the steps of: changing shapes of an opening configuration of the gate in response to molding of a minus lens having a thicker peripheral portion than a central portion thereof and molding of a plus lens having a thinner peripheral portion than a central portion thereof; and changing the volume of a connection portion of the runner and the sprue to be smaller when the plus lens is molded than when the minus lens is molded.

According to the aforementioned lens producing method, in addition to the aforementioned acting effects, the lens molding is molded by defining the volume of the connection portion of the runner and the sprue in the case of molding the plus lens to be smaller than in the case of molding the minus lens, that is to say, although the back flow of the molten resin flown form the cavity is controlled when the plus lens is molded, the volume of the connection portion of the runner and the sprue is smaller, so that the occurrence of the void space caused by the shrinkage of the molten resin in the connection portion can be controlled. Therefore, in the washing process with the cleaning fluid and the coating process with the coating fluid for the lens molding, the white turbidity fluid caused by mixing both of the cleaning fluid and the coating fluid is not produced.

In the description thus far, the lens molding may be a spectacle lens having a meniscus-shape; and in this case, it is advisable that the opening area of the gate for molding the minus lens is larger than the opening area of the gate for molding the plus lens.

As a method for changing the gate opening configuration in the molding of the minus lens and the plus lens, it is desirable that the gate is provided therein with a gate top member, determining the opening configuration of the gate, so that the gate opening configuration, formed by a space between the inner face of the gate and the gate top member, is changed by changing at least one of a width, the gate angle, and a height of the gate top member as determinant elements of the gate opening configuration.

As a method for decreasing the volume of the connection portion of the runner and the sprue in the molding of the plus lens as compared with in the molding of the minus lens, the projected top member may be placed in the side of the runner adjacent to the sprue in the molding of the plus lens.

INJECTION MOLDING DIE FOR MOLDING A LENS

An injection molding die for molding a lens according to the present invention in order to mold a lens molding made of a thermoplastic resin is characterized by including a cavity for molding a lens; a gate opened toward the cavity, in which the gate is provided therein with a gate top member determining an opening configuration of the gate and each of the plural gate top members prepared for changing the gate opening configuration is placed in the gate to be exchanged.

According to the aforementioned injection molding die for molding a lens, in a pilot production for the lens, each of the plural prepared gate top members is located in the gate to be exchanged, thereby the pilot production is carried out to correspond with each of various lenses. As a result, the gate top member capable of obtaining the appropriate gate opening configuration in correspondence with each of various lenses is checked, and the checked gate top member is used in a full-scale production of the lens. Therefore, from the fact that the pilot production is carried out by means of changing the gate opening configuration by exchanging a small parts as the gate top members, it is not required that a plurality of molding dies having the different size of the gate opening configuration from one another are prepared, resulting in the attainment of small cost and the gate structure capable of molding various lenses with a high power of precision.

Another injection molding die for molding a lens according to the present invention in order to mold a lens molding, made of a thermoplastic resin, with a washing process by a cleaning fluid and a coating process by a coating fluid, is characterized by including plural molding lens cavities for molding a lens portion; a gate opened toward each of the cavities; a runner connecting between the plural cavities through the gate; and a sprue connected to the runner, in which the gate is provided therein with a gate top member determining an opening configuration of the gate, each of the plural gate top members prepared for changing the gate opening configuration is placed in the gate to be exchanged, and a connection portion of the runner and the sprue is provided therein with a projection protruding toward the inside of at least one of the runner and the sprue.

According to the aforementioned injection molding die for molding the lens, in addition to the aforementioned acting effects, from the fact that the projection protruding toward the inside of at least one of the runner and the sprue is provided to the connection portion of the runner and the sprue, a pinch portion can be formed to the connection portion of the runner forming portion and the sprue forming portion of the lens molding with the projection. Therefore, the volume corresponding to the pinch portion is small, so that the void space caused by the shrinkage of the molten resin can be controlled to be produced at the pinch portion. As a result, the white turbidity fluid caused by mixing the cleaning fluid and the coating fluid is not produced in the washing process with the cleaning fluid and the coating process with the coating fluid for the lens molding.

In the description thus far, the gate top member changing the top opening configuration may be fitted to the overall gate and for example, a molten resin flowing hole having a different diameter is formed at the central portion of the gate top member, but in the case each gate top member has a difference in at least one of determinant elements of a width, the gate angle and a height, the gate opening configuration can be changed by using at least one of the width, the gate angle and the height, so that various gate structure adaptable to each of various lenses can be obtained (e.g., one kind of the plus lens and two kinds of high-power and low-power minus lens).

The opening configuration of the gate is preferably defined as 1 mm to 3 mm in the case of the gate for the plus lens and more than 5 mm in the case of the gate for the minus lens. Furthermore, the angle of the gate is preferably defined as 60 degrees to 90 degrees, in which it is attached with a condition that inflow of the molten resin is not extremely interrupted at the restricted portion.

When two kinds of gate forming member, which a notch portion is formed on the face opposing to the gate top member and which the notch portion is not formed, are prepared and used by exchanging, the gate opening configuration can be changed by selecting the use of the gate forming member having the notch portion and the gate forming member not having the notch portion although the same gate top member is used, resulting in the reduction of the number and kinds of gate top members prepared.

The projection provided to the connection portion of the runner and the sprue may be combinedly formed to the structural member of the injection molding die for molding the lens, but it is advisable that the projection is formed with the projected top member to detach from and attach to the injection molding die for molding the lens. By forming with the detachable projected top member, when the projection is not needed in molding, for example, when the minus lens is molded, only the projected top member is removed and the cavity forming member forming the cavity is changed to a member for molding the minus lens, and the injection molding die for molding the lens can be continuously used, namely, the injection molding die for molding the lens can be used in common. Incidentally, the projected top member can be detached from and attached to the injection molding die for molding the lens by being the projected top member to be an insertable absolutely fitting type for the injection molding die for molding the lens or by removably attaching the projected top member with a stopper such as a bolt or the like.

LENS MOLDING

A lens molding according to the present invention, having plural lens portions molded in molding lens cavities in an injection molding die for molding a lens, a runner forming portion, connecting between the lens portions, formed with a runner of the injection molding die for molding the lens, and a sprue forming portion, connected to the runner forming portion, formed with a sprue of the injection molding die for molding the lens, and undergoing a washing process with a cleaning fluid and a coating process with a coating fluid, comprising a pinch portion formed to a connection portion of the runner forming portion and the sprue forming portion.

According to the aforementioned lens molding, the pinch portion is formed to the connection portion of the runner forming portion and the sprue forming portion and the volume of the part corresponding to the pinch portion is smaller, so that the void space caused by the shrinkage of the molten resin in this part can be controlled. As a result, the white turbidity fluid caused by mixing the cleaning fluid and the coating fluid is not produced in the washing process with the cleaning fluid and the coating process with the coating fluid for the lens molding.

In the description thus far, the area for forming the pinch portion may be defined in the whole intersecting part intersecting the runner forming portion and the sprue forming portion in the T-shaped state or the like or in only the sprue forming portion of the intersecting part, and the pinch portion can be formed by decreasing the diameter of the runner portion connected to the sprue forming portion at the right angle, which is the side adjacent to the sprue forming portion. The diameter of the whole intersecting part of the runner forming portion and the sprue forming portion can be decreased within the range of ensuring the strength of the lens molding (which is dependent upon the solid state properties of the molten resin, the lens configuration or the like).

The lens portion formed in the cavity may be the meniscus lens for the spectacle lens or the other kinds of the lens without the spectacle lens. Further, the lens may be the plus lens and the minus lens, but the present invention is effectual in the case of molding the plus lens, especially, the plus lens having the low diopter (for example, the lens of +0.25 Diopter to +2.00 Diopter), the plus lens excluding astigmatism or the like.

BEST MODE FOR CARRYING OUT THE INVENTION

Figure 1:
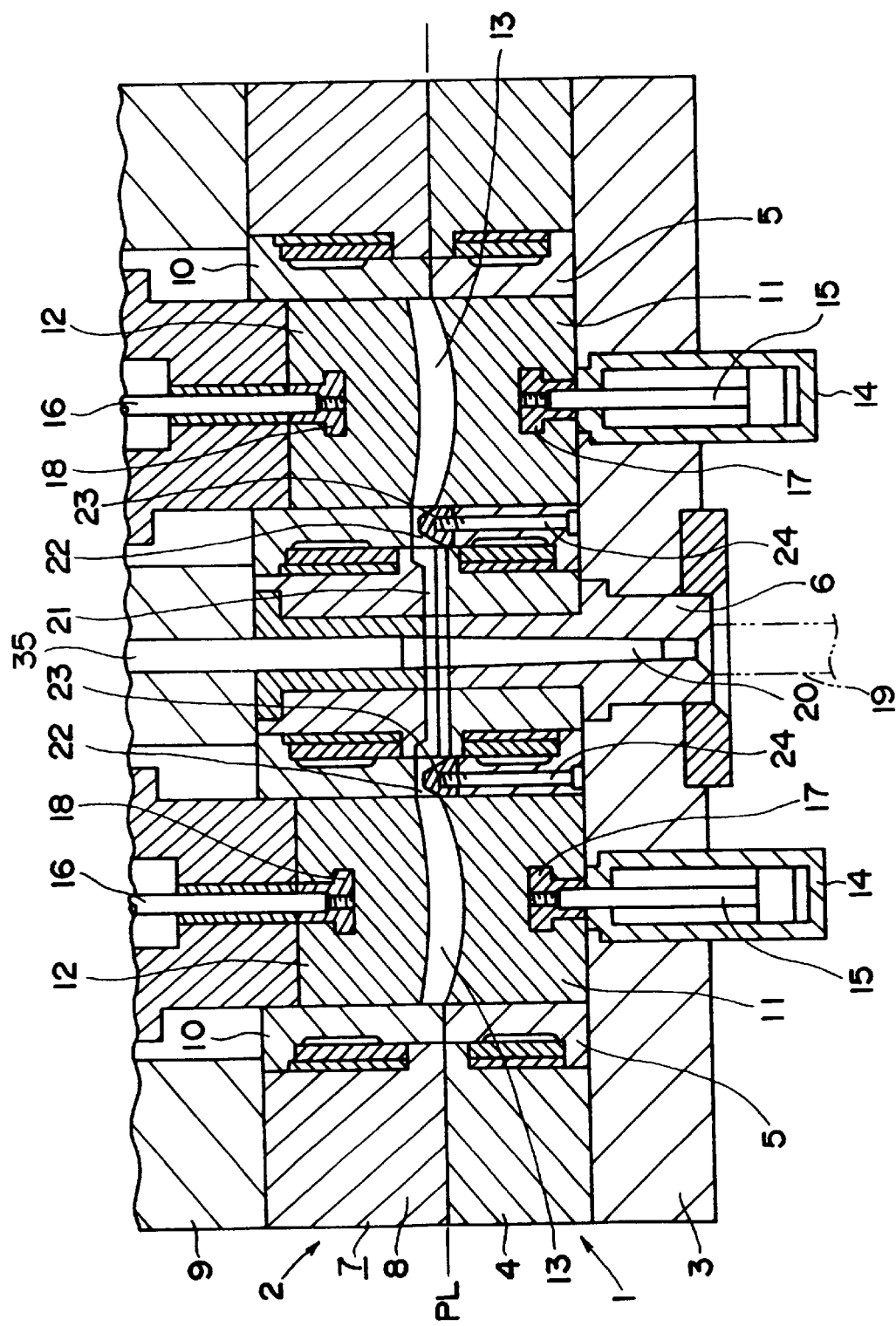
FIG. 1 is a vertical sectional view of an injection molding die for molding a lens according to a preferred embodiment of the present invention.
Figure 2:
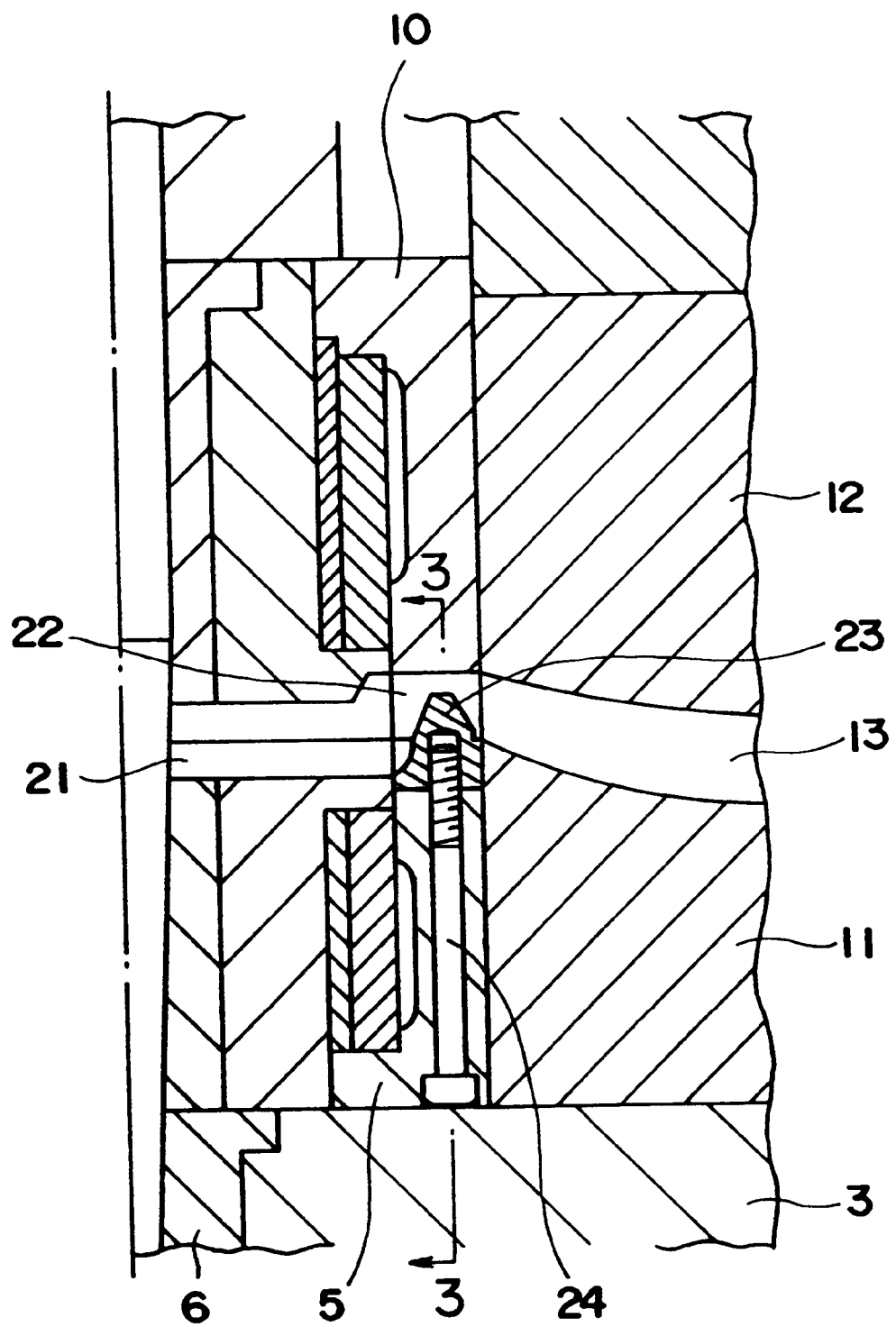
FIG. 2 is an enlarged view of a gate portion.

The preferred embodiment according to the present invention will be explained below with reference to the attached drawings. FIG. 1 is a vertical sectional view of an injection molding die for molding a lens relating to the embodiment in order to mold a spectacle lens having a meniscus-shape of diopter of +3.00 and a lens diameter of 70 mm, and FIG. 2 is a partial enlarged view of FIG. 1. The injection molding die for molding a lens is for molding the spectacle lens using a thermoplastic resin, such as PMMA (poly methyl methacrylate), PC (polycarbonate) or the like, as materials, in which can mold it with selective materials, such as metal material, glass, ceramic or the like.

As shown in FIG. 1, the injection molding die for molding the lens is composed of a lower die 1 as a stationary type and an upper die 2 as a movable type, which are divided at a horizontal parting line PL in the vertical direction. The lower die 1 is, in turn, composed of die plates 3 and 4, a tubular insert guide 5, a sprue bush 6 and so on. A body 7 of the upper die 2 is composed of die plates 8 and 9, a tubular insert guide 10 and so on. The die body 7 is attached to a die fitting member, coupled with a clamping cylinder (not shown), to be able to move in the vertical direction to cause the die to close to and open from the lower die by the great vertical movement of the die fitting member, caused by the clamping cylinder.

A lower insert 11 and an upper insert 12 are slidably inserted into the lower insert guide 5 and the upper insert guide 10 respectively. The aforementioned insert guides 5 and 10 and the inserts 11 and 12 form a cavity 13 for molding the spectacle lens. In the embodiment, the two cavities 13 are provided in the horizontal direction.

The lower insert 11 is coupled with the end of a piston rod 15 of a hydraulic cylinder 14, attached to the lower die 1 in a downward direction, through a T-shaped engagement member 17. The upper insert 12 is coupled with the end of a piston rod 16 of a hydraulic cylinder (not shown), located in the upper die 2 in a downward direction, through a T-shaped engagement member 18.

A cylinder for slightly opening is coupled through plural member with the hydraulic cylinder (not shown) attached through the piston rod 16 to the upper insert 12, so that the upper insert 12 is moved up at a defined degree by operation of the cylinder for slightly opening when the upper die 2 is closed against the lower die 1 by the clamping cylinder, thereby the amount of compression of a molten resin fed into the cavity 13 by increasing the height of the cavity 13, and the upper insert 12 is moved down at the aforementioned amount of the compression by the clamping cylinder.

T-shaped engagement grooves, formed in the inserts 11 and 12 for engaging with the aforementioned T-shaped engagement members 17 and 18, are opened to be extended to the circumferential edges of the inserts 11 and 12, so that the inserts 11 and 12 are removed from the T-shaped engagement members 17 and 18 of the piston rods 15 and 16 by moving the inserts 11 and 12 in the horizontal direction after the upper die 2 is opened from the lower die 1 by the clamping cylinder and the piston rods 15 and 16 are operated to be extended, thereby the upper insert 11 and the lower insert 12 can be exchanged. More specifically, it is possible to perform the operation for exchanging the inserts which are prepared for forming a minus lens, a plus lens, a semi-finish lens and various lenses having the different diopter of the above lenses. Incidentally, after the inserts are exchanged, the new inserts are set to the injection molding die for molding the lens by operating the piston rods 15 and 16.

The sprue bush 6 of the lower die 1 is connected to an injection nozzle 19 and formed therein with a sprue 20 extending in the vertical direction. A runner 21, formed on the aforementioned die plates 4 and 8 as structural members of the upper die 2 and the lower die 1, is extended from the upper side of the sprue 20 in the horizontal direction, and at both of the ends of the runner 21, gates 22 are formed to be opened toward the circumferential edge of the molding spectacle-lens cavity 13. The gates are formed to cut a part of each of the lower insert guide 5 and the upper insert guide 10, therefore the insert guides 5 and 10 are gate forming members for forming the gates 22 as well as the guiding members for guiding the inserts 11 and 12 to slide in the vertically direction.

The lower die 1 and the upper die 2 described thus far are each assembled by joining the structural members with bolts, therefore the lower die 1 and the upper die 2 can be assembled and disassembled by the bolts.

Figure 3:
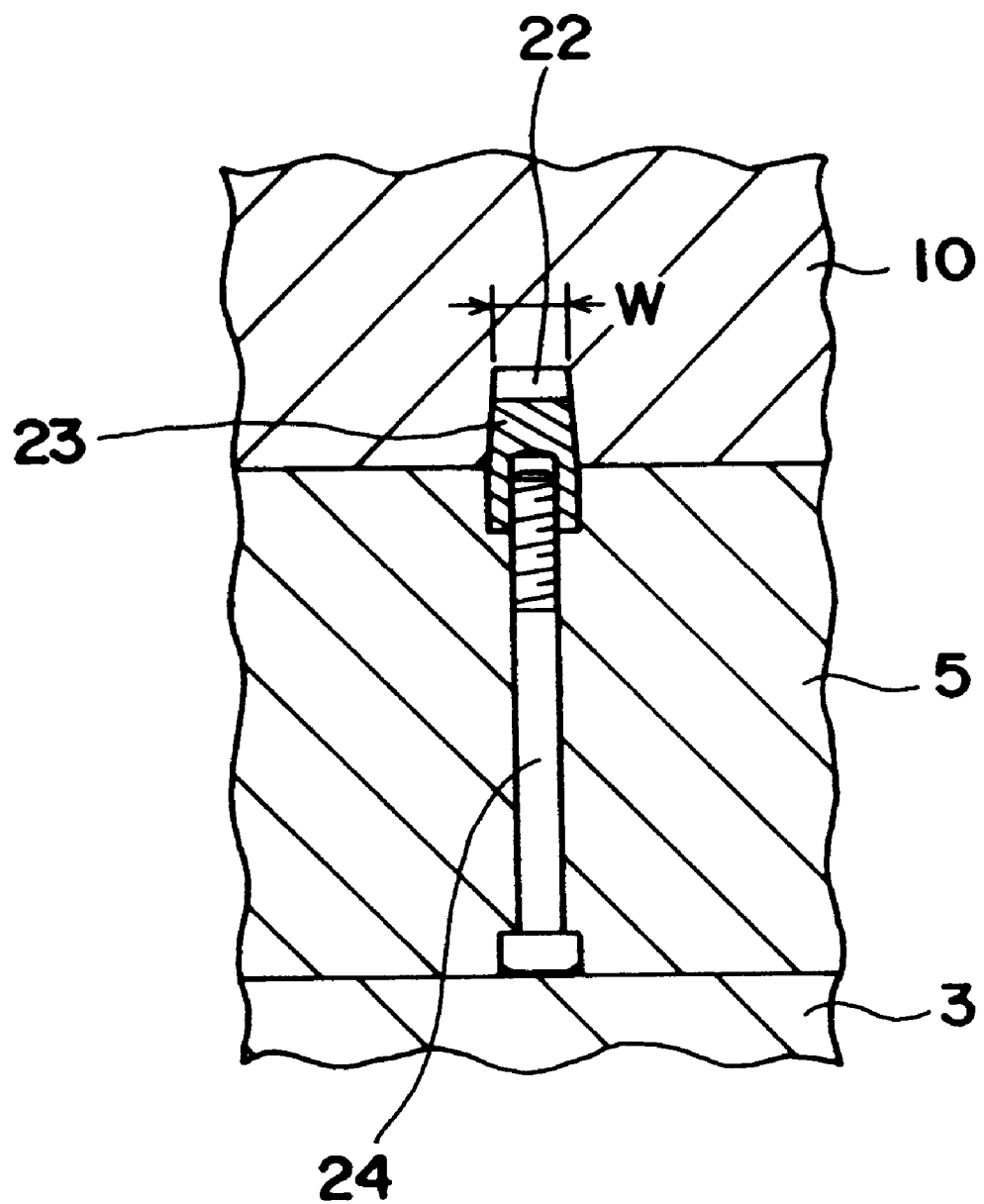
FIG. 3 is a sectional view taken along the III—III line in FIG. 2.

As enlargedly shown in FIG. 2 and FIG. 3, an upward convex-shaped gate top member 23 is located to the gate 22 to be fixed on the upper face of the insert guide 5 with a bolt 24 passed through the lower insert guide 5. The gate top member 23 to the gate 22 is attached by the bolt 24, so that the gate top member 23 can be removed by removing the die plate 3 after the lower die 1 and the upper die 2 are separated, thereby the gate top member can be exchanged with various gate top members previously prepared.

Figure 4:
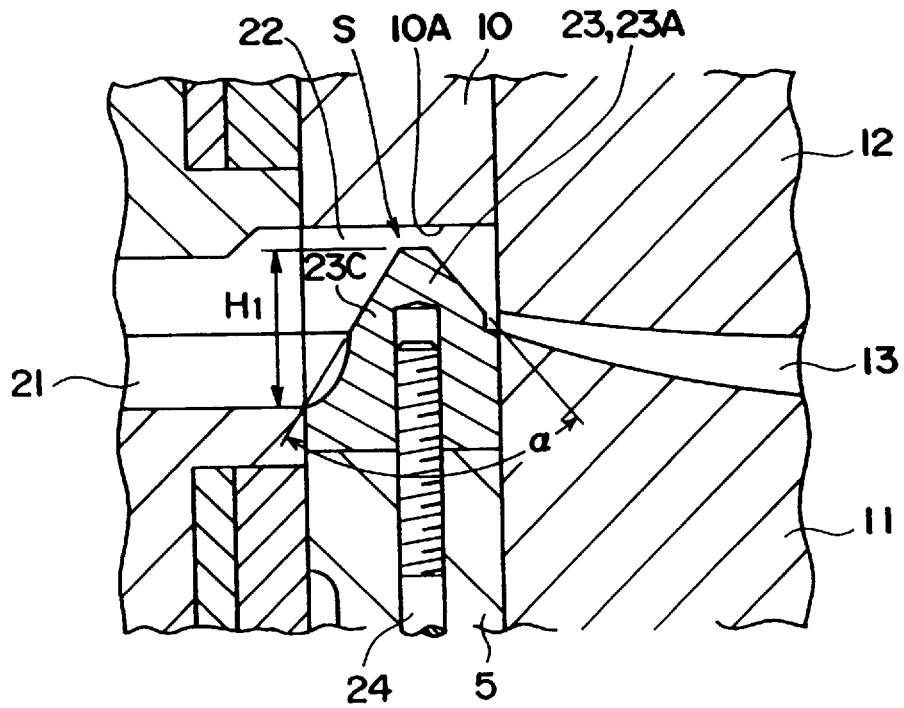
FIG. 4 is a sectional view of the periphery of the gate showing the case that a gate top member having a longer length is located at the gate.
Figure 5:
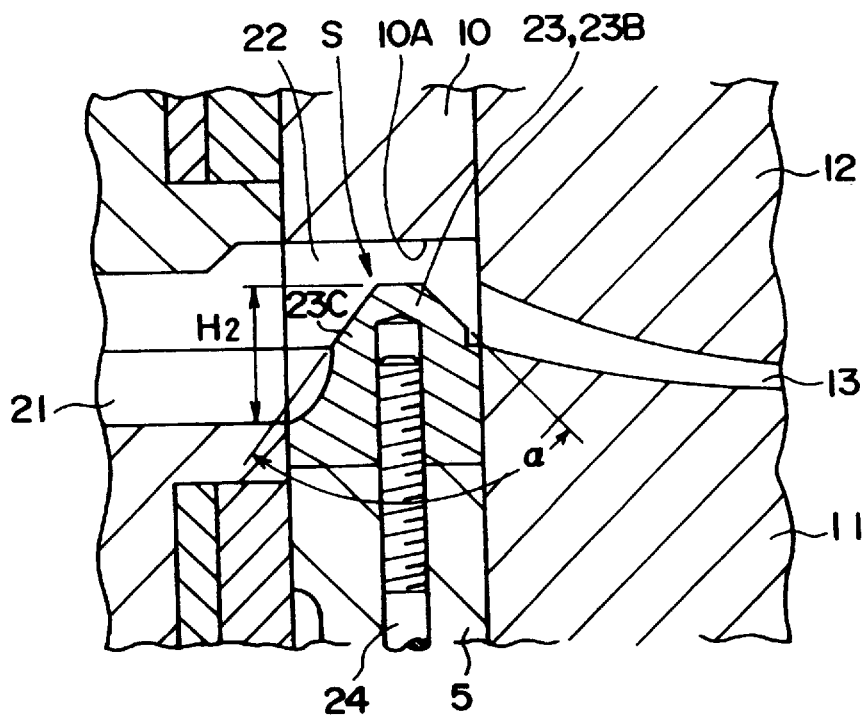
FIG. 5 is a similar view to FIG. 4 in the case that a gate top member having a shorter length is located at the gate.

In FIG. 4 and FIG. 5, examples of various gate top members previously prepared are shown. In FIG. 4, a gate top member 23A is used in order to produce the spectacle lens having the diopter of +4.00 and the lens diameter of 70 mm, and in FIG. 5, a gate top member 23B is used in order to produce the spectacle lens having the diopter of 6.00 and the lens diameter of 70 mm.

The gate top members 23A and 23B have different heights H1 and H2 from one another, that is to say each of various gate top members previously prepared has a slightly different height from one another. Therefore, whenever each gate top member 23 having a different height is placed at the gate by being exchanged, the size of a space 5 formed between an upper face of the gate top member 23 and a lower face 10A of the upper insert guide 10, which forms the inner faces of the gate 22 to be opposed to the gate top member 23 in the vertical direction, is changed, thereby an opening configuration (an opening area) of the gate 22 is naturally changed, with the result that the amount of the molten resin flown into the cavity 13 during a specified time is changed.

When the molten resin is fed into the cavity 13 through the sprue 20, the runner 21, and the gate 22 from the injection nozzle 19 shown in FIG. 1 in pilot production of the spectacle lens, the upper insert 12 is moved upward by the increasing the die fitting member, thereby the volumetric capacity of the cavity 13 is increased, and then the molten resin is compressingly molded to be a defined configuration after the molten resin is fed.

The gate top member used in the pilot production is based on a configuration of the produced lens, or a configuration of the cavity 13, in which the pilot production is carried out by using the gate top member 23A, having the higher height to decrease the opening area of the gate 22, when the produced lens is the plus lens having the thinner peripheral portion than the central portion as shown in FIG. 4, by using the gate top member 23B, having the sorter height to increase the opening area of the gate 22, when the produced lens is the minus lens having the thicker peripheral portion than the central portion as shown in FIG. 5, and further by using each gate top member having a slightly different height from one another to correspond with each of various lenses differing the lens diopter form one another in the any case of the plus lens and the minus lens.

Incidentally, in the case of the semi finish lens having the sufficient thickness for preconditioning a following process for a plano-concave surface of lens or a plano-convex surface of lens, the pilot production is carried out with the same method as the case of the plus lens regardless of the lens diopter of the minus lens and the plus lens. Through the pilot production, the gate top member, which allow to mold each lens with a defined high-accuracy, is selected and a full-scale production for the spectacle lens is carried out with the use of the selected gate top member.

Figure 6:
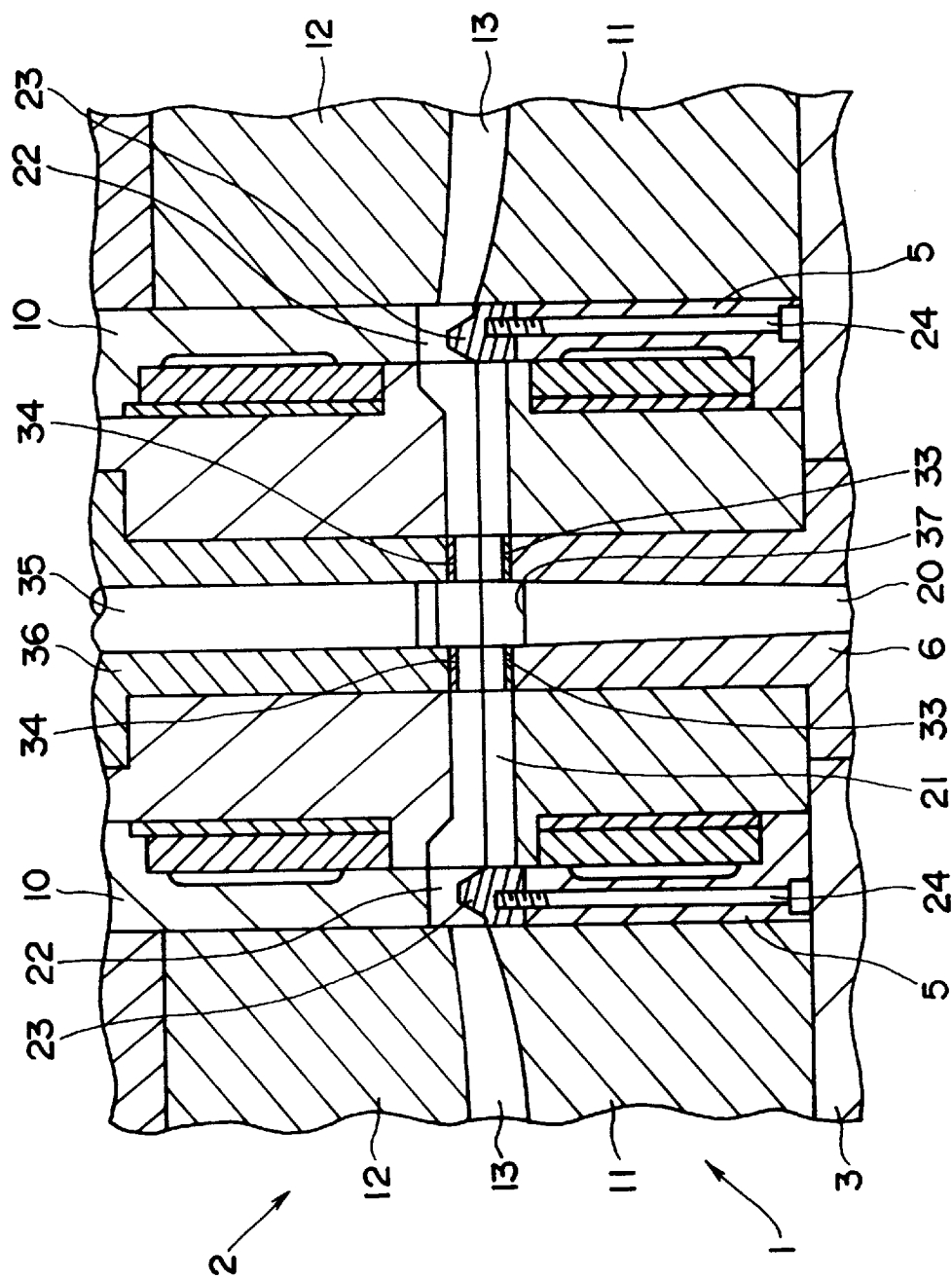
FIG. 6 is a fragmentary enlarged view of FIG. 1.

As enlargedly shown in FIG. 6, at the connection portion of the runner 21 and the sprue 20, more specifically, at the end, adjacent to the sprue 20, of the runner 21 connected to the central portion of the sprue 20 at the right angle, projected top members 33 and 34 are placed to protrude toward the inside of the runner 21, in which the projected top members 33 and 34 are projections provided at the connection portion between the sprue 20 and the runner 21 provided in the injection molding die for molding the lens.

The aforementioned upper and lower projected top members 33 and 34 are half-divided tubular members, in which the projected top member 33 is tightly coupled to be put onto the upper end of the sprue bush 6 provided in the lower die 1 and the projected top member 34 is tightly coupled to be put onto the lower end of the guide member 36 provided in the upper die 2 to slidably guide the eject pin 35 in the vertical direction. When the upper die 2 is opened from the lower die 1 by the clamping cylinder, the projected top members 33 and 34 can be removed from the sprue bush 6 and the guide member 36, therefore, the projected top members 33 and 34 is provided to be detachable for the lower die 1 and the upper die 2.

Incidentally, a structure of the detachable projected top members 33 and 34 is not limited to the aforementioned structure, and the projected top members 33 and 34 may be to be detachable by bolts, passed through the sprue bush 6 and the guide member 36 in the vertical direction to attach the projected top members 33 and 34.

Figure 7:
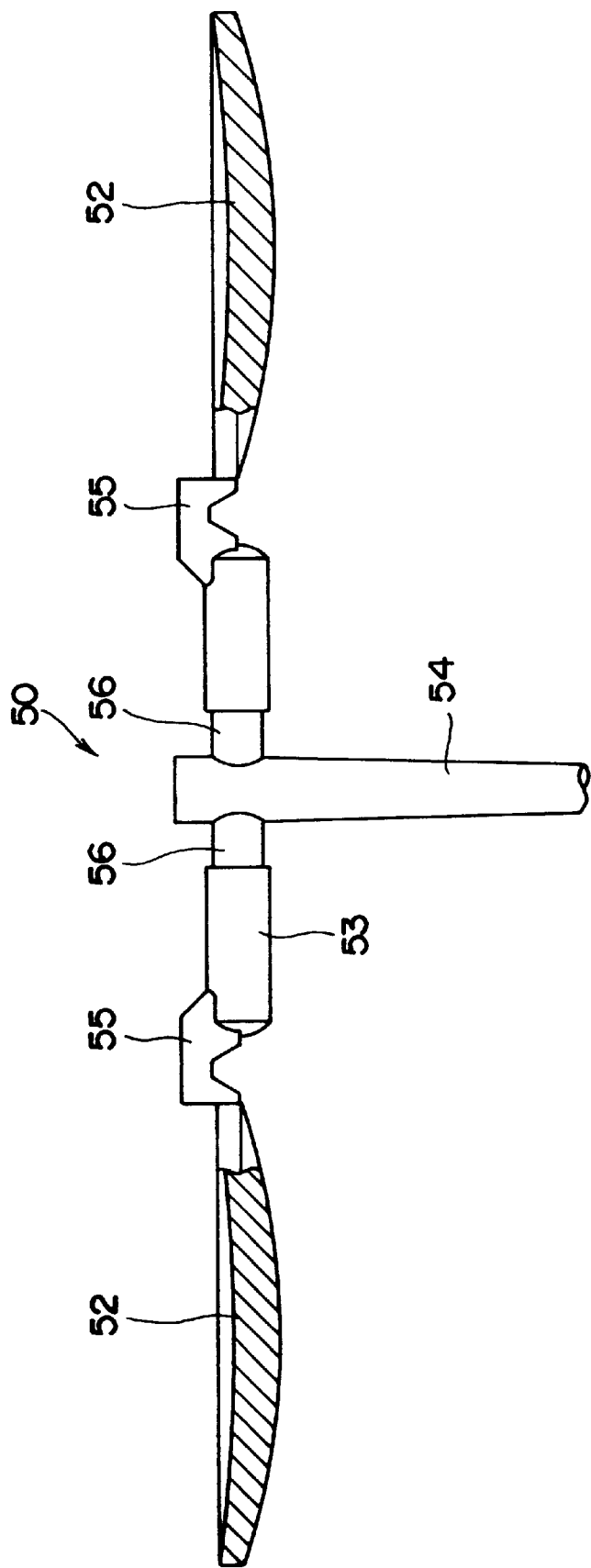
FIG. 7 is a front view when a part of a produced lens molding is cut.

The producing operations of the spectacle lens molding made of plastic with the use of the injection molding die for molding the lens will be below explained. A spectacle lens molding 50 produced in the operations is a plus lens having the thicker central portion than the peripheral portion as shown in FIG. 7. Incidentally, the spectacle lens molding 50 needs a grip portion 51 for an operation of the aftertreatment as sown in FIG. 8, so that, in the embodiment, a hollow portion 27 is formed at the connection portion between the sprue and the runner 21 of the injection molding die for molding the lens to be extended in a direction at right angles to paper illustrating FIG. 1 (see FIG. 6).

When the upper die 2 is closed to the lower die 1 by the clamping cylinder and the upper insert 12 is moved up at the defined degree by the cylinder for slightly opening, the molten resin is injected from the injection nozzle 19 shown in FIG. 1. The molten resin is fed into both cavities 13 through the sprue 20, the runner 21 and the gate 22. During or after the feeding process, the upper insert 12 is moved down by the clamping cylinder to compress the molten resin in the cavity 13. Therefore, the molten resin is rendered even by a back-flow of the molten resin when the amount that molten resin is fed into both cavities 13 is uneven, and the surface shapes of the lower insert 11 and the upper insert 12 are transferred to the molten resin.

After the molten resin fed into the cavity 13 is solidified, the upper die 2 is opened from the lower die 1 by the clamping cylinder, and then the upper insert 12 and an eject pin 35 are moved down by an operation of an ejecting means (not shown) to push out the spectacle lens molding 50 shown in FIG. 7.

Figure 8:
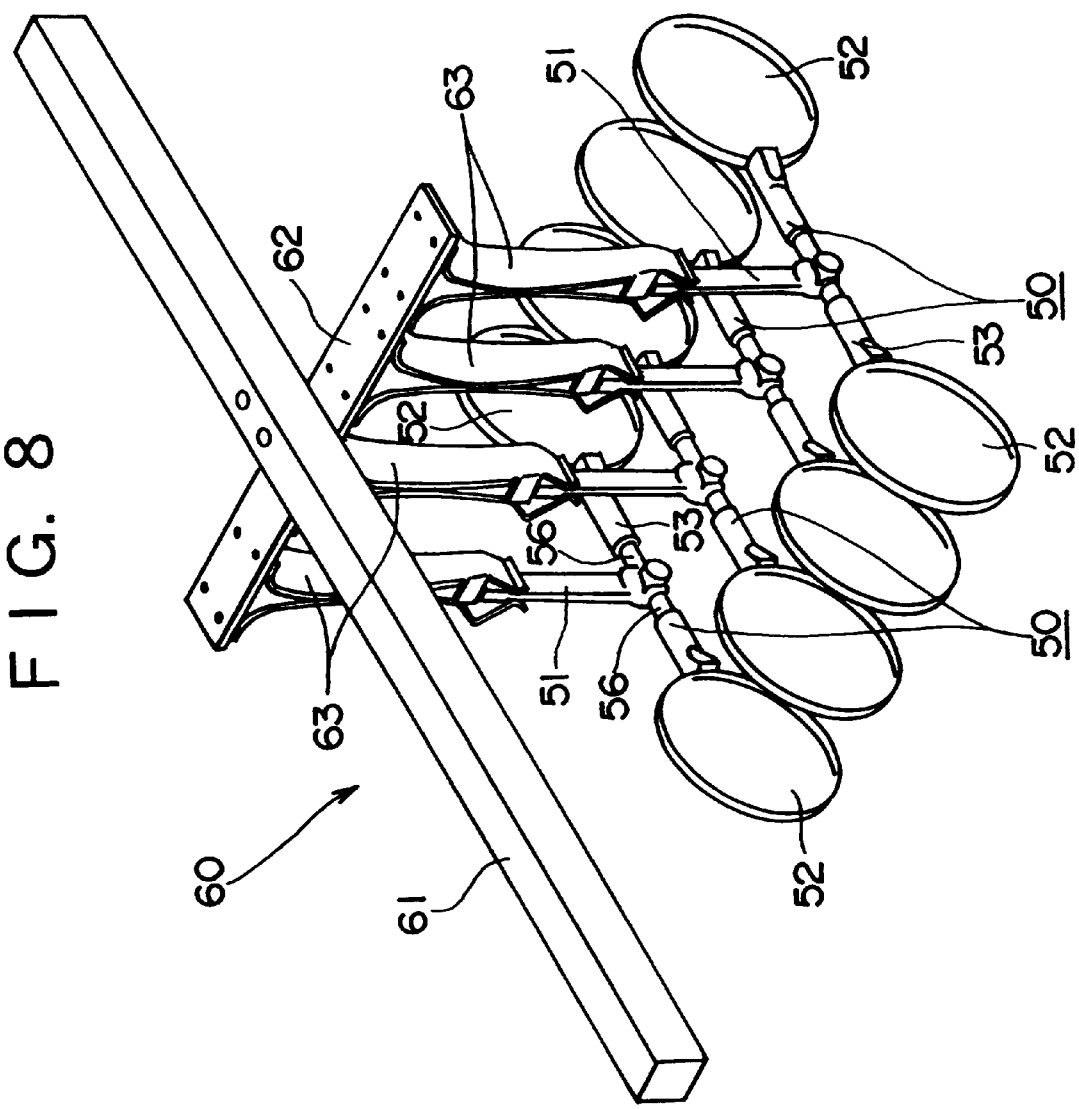
FIG. 8 is a perspective view showing the state in which plural lens moldings are held with a working tool in order to perform a final process.

The pushed spectacle lens molding 50 has two lens portions 52 as meniscus lenses for the spectacle lens compressedly molded in the cavities 13, a runner forming portion 53 coupled with the lens portions 52 formed in the runner 21, a sprue forming portion 54 formed in the sprue 20 and connected to the end of the runner forming portion 53, and a gate forming portion 55 formed in the gate 22 and provided between the lens portion 52 and the runner portion 53, in which the grip portion 51, shown in FIG. 8, is extended from the central portion of the runner forming portion 53.

Pinch portions 56, formed by using the project top members 33 and 34, are formed at the side of the runner forming portion 53 adjacent to the sprue forming portion 54 in the connection portion formed of the runner forming portion 53 and the sprue forming portion 54.

As described thus far, the opening of the gate 22 in the injection molding die for molding the lens is narrowed by the gate top member 23, so that the amount of the backflow of the molten resin, which is produced when the molten resin in the cavity 13 is compressed by the upper insert 12, is controlled to be smaller even when the lens portion 52 molded by the molten resin in the cavity 13 is the plus lens having the thinner peripheral portion than the central portion, therefore, the peripheral portion of the lens portion 52 can be formed with the high-precision of the configuration without the influence of "molding sink".

Although the back-flow of the molten resin from the cavity 13 is controlled as described above, the connection portion of the runner forming portion 53 and the sprue forming portion 54, originally having larger volume, is the pinch portion 56 having the reduced diameter, so that the pinch portion 56 has smaller volume, with the result that void space caused by shrinking and lacking the molten resin is not produced.

The pinch portion 56 having the smaller diameter is formed, especially, at the side of the runner forming portion 53 adjacent to the sprue forming portion 54 in the connection portion of the runner forming portion 53 and the sprue forming portion 54, so that strength of the overall injected molding 50 is increased as compared with the case that the pinch portion 56 is formed at the part, intersected with the runner forming portion 53, in the sprue forming portion 54, resulting in easiness of the handling properties of the injected molding 50.

FIG. 8 shows a working holder 60 used for operating the after-treatment for the injected molding 50. The working holder 60 has a bar member 61, a holding member 62 joined to the bar member 61 at the right angle, and hanging members 63 arranged to the holding member 62 to hang and support the lens molding 50 by picking up the grip portions 51, in which the hanging member 63 is composed of a pair of plate springs. Before the lens molding 50 is held with the working holder 60, the sprue forming portion 54 of each lens molding 50 is cut and removed.

Figure 9:
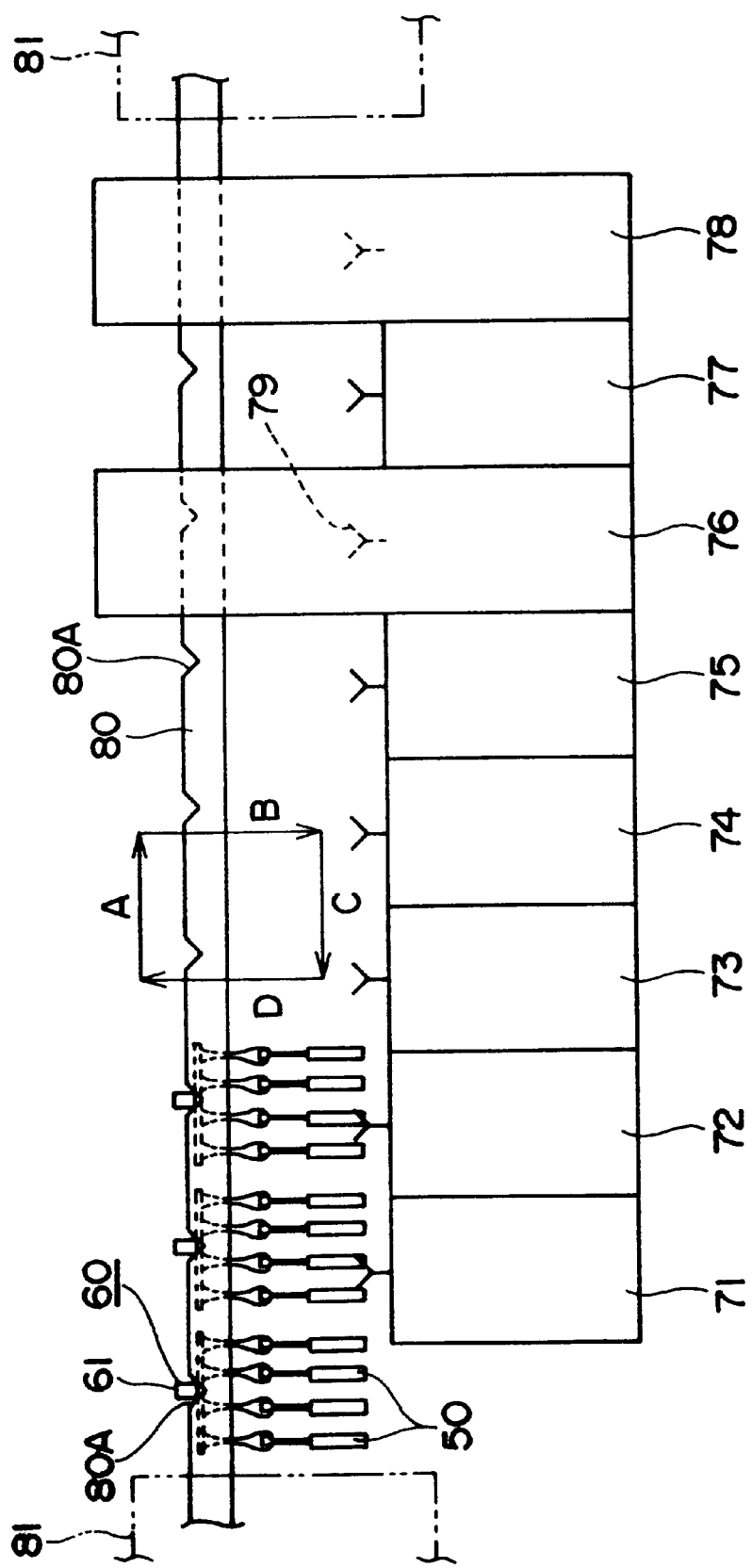
FIG. 9 is a diagrammatic front view showing a device for performing a washing process and a coating process as the final process.

FIG. 9 shows a diagrammatic sketch of a device for carrying out a washing process and a coating process as the after-treatment of the lens molding 50. The device 70 includes washing tanks 71 to 73, a drying tank 74, a base-coat tank 75, a base-coat furnace 76, a top-coat tank 77, and a top-coat furnace 78 which are arranged in order. The washing tanks 71 to 73 accommodate a cleaning fluid of supplied-water or pure water, the drying tank 74 is provided therein with a heater, the base-coat tank 75 accommodates a prime coat fluid, the base-coat furnace 76 has an internal heater, the top-coat tank 77 accommodates a hard coating fluid, and the top-coat furnace 78 has an internal heater. Further, a pair of Y-shaped support members 79 is provided in each tank and each furnace.

Further, the device 70 includes a pair of parallel walking beams 80, in which a recess portion 80A is formed in the same space as the support member 79 to the walking beam 80. The walking beam 80 is coupled with the driving means 81 to repeat rectangular movement of forward-moving A, downward-moving B, backward-moving C and upward-moving D. After the lens moldings 50 are hung by hooking both ends of the bar member 61 of the working holder 60 onto the recess portions 80A of a pair of the walking beams 80, the walking beam 80 repeats the aforementioned rectangular movement, thereby the bar member 61 is delivered to the support member 79 to send the lens moldings 50 to the aforementioned tanks and furnaces in order, therefore the lens moldings 50 undergo the washing process with the cleaning fluid, the drying process, and the coating process with coat fluids.

During the aforementioned processes, as described above, the void space as the lacked portion is not produced at the connection portion of the runner forming portion 53 and the sprue forming portion 54 of the lens molding 50, so that a disadvantage, which the surface of the lens portion 52 is stained with a white turbidity fluid caused by reaction and mixture of the coat fluid and the cleaning fluid remaining in the void space if the recess-like void space is produced, is not produced, resulting in the protection of commercial value of the lens portion 52.

Figure 11:
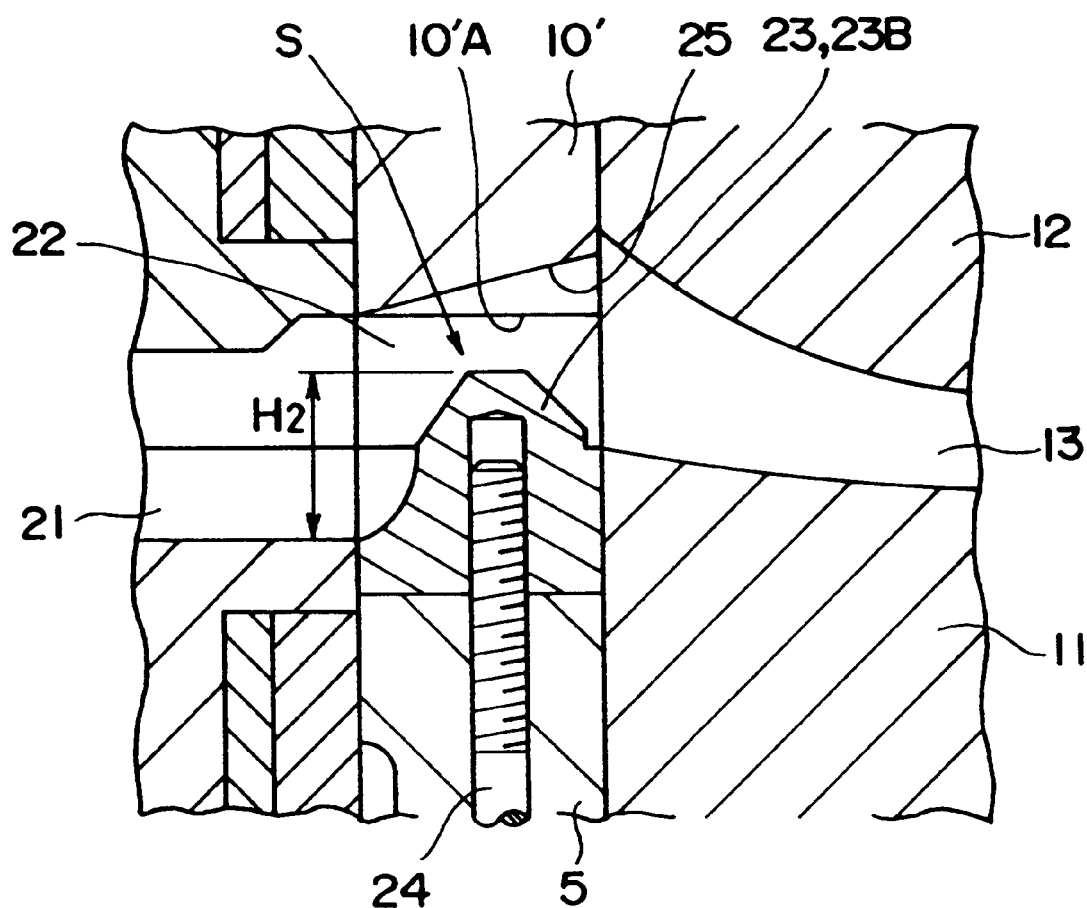
FIG. 11 is a similar view of FIG. 6 in the case that a minus lens, having the thinner central portion than the peripheral portion, is produced.

FIG. 11 shows a preferred embodiment in which the opening configuration of the gate can be changed with the use of the same gate top member 23B as FIG. 5. In the embodiment, a notch portion 25 is formed on a lower face 10'A of an upper insert guide 10' as the gate forming member which is opposed to the gate top member 23B in the vertical direction, therefore, the opening area of the gate 22 can be larger than the case of using the upper insert guide 10 in which the notch portion 25 is not formed. According to the aforementioned structure, by a combination of the various gate top members 23 and the upper insert guides 10 and 10', the further various opening areas of the gate 22 can be obtained and the number and kinds of gate top members which should be prepared can be reduced.

Figure 10:
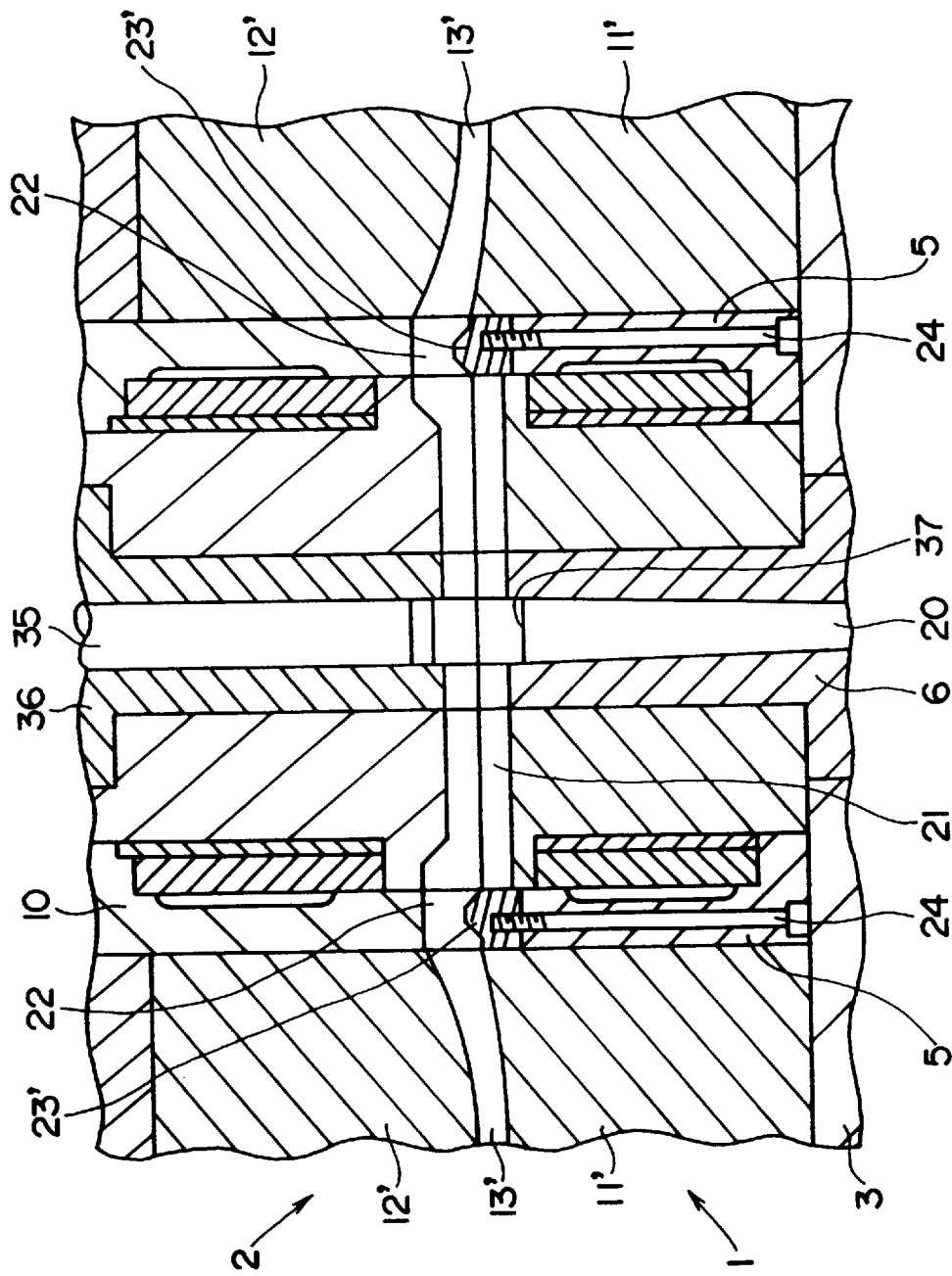
FIG. 10 is a similar view to FIG. 4 and FIG. 5, showing the case of the use of a gate forming member formed therein with a notch portion.

In the embodiment of FIG. 10, the notch portion 25 is shaped to expand toward the cavity 13, so that the flow properties of the molten resin from the gate 22 to the cavity 13 is sufficient, with the result that the feed of the molten resin to the cavity 13 can be ensured.

Incidentally, as described above, the upper die 2 as well as the lower die 1 is assembled by joining each structural member with the bolts, so that the operation for exchanging the upper insert guides 10 and 10' is carried out by disassembling to remove the bolts. The various upper insert guides each having the different-sized notch portions 25 may be previously prepared to exchange.

In the embodiment described thus far, the opening configuration of the gate is changed with the height of the gate top member 23, but the suitable change of the gate opening configuration for each lens can be performed by changing a gate angle α of a convex portion 23C of the gate top members 23 prepared in plural as shown in FIG. 4 and FIG. 5, and by changing the width of the gate top member 23 as shown in FIG. 3. The gate angle α is 45 degrees in FIG. 4, but the range of 0 degree to 70 degrees is suitable to flow the molten resin into the cavity 13.

The gate 22 is essential to appropriately distribute the resin in the structure having the plural cavities 13, in which the equable distribution of the resin into each cavity 13 is one of the conditions in order to obtain the lens with great precision. In the initial injecting stage, there is sometimes the case that the resin is not distributed from view of effect by the solid state properties of the degree of viscosity of the resin or the like or from view of the precision of the injection molding die, and sometimes, this case is somewhat controlled by the back-flow of the resin, however, the excessive back-flow becomes the cause of remaining the history of the fed resin, so that it is needed that the history is avoided to be produced. Therefore, the gate angle a of the convex portion 23C of the gate top member 23, which results forming a restricted portion of the gate 22 as shown in FIG. 4 and FIG. 5, is defined at the degree capable of avoiding producing the excessive back-flow not to avoid producing the appropriate back-flow.

In the case of molding the plus lens shown in FIG. 4, the peripheral portion of the plus lens is susceptible to the precision of the shape by "molding sink" because of the thin peripheral portion of the plus lens, so that the gate opening configuration formed by the gate top member 23A of FIG. 4 is adapted to be a configuration in which the back-flow is hardly produced as compared with the case of molding the minus lens, therefore the peripheral portion can be formed without the influence of the back-flow. In the case of molding the minus lens shown in FIG. 5, in order to improve the effect of avoidance of producing a weld mark, the gate opening configuration formed by the gate top member 23B is adapted to be a configuration in which the resin is easily flown into the cavity 13 as compared with the case of molding the plus lens.

FIG. 11 shows the production of a spectacle meniscus lens as the minus lens having the thicker central portion than the peripheral portion. In the aforementioned production, the lower insert 11' and the upper insert 12' for molding the minus lens are placed in the injection molding die for molding the lens, in which the cavity 13' for molding the minus lens is placed between the lower and upper inserts 11' and 12'. The gate top member 23' located to the gate 22 has a shorter height than the aforementioned gate top member 23 in order to easily flow the molten resin into the cavity 13' and to be able to produce the great back-flow when the molten resin in the cavity 13' is compressed by the upper insert 12', thereby the opening of the gate is larger.

Further, from the fact the great back-flow is produced, the aforementioned projected top members 23 and 24 for forming the pinch portion to the lens molding are not placed to the connection portion of the runner 21 and the sprue 20. Therefore, the connection portion of the runner 21 and the sprue 20 has a smaller volume when the plus lens is molded than when the minus lens is molded. In the embodiment, the projected top members 23 and 24 are provided to be detachable for the injection molding die for molding the lens, so that both of the plus lens and the minus lens can be produced by using the same injection molding die by means of attaching and detaching the projected top members 23 and 24.

Industrial Availability

According to the present invention, the opening configuration of the gate can be changed by exchanging the gate top members and the appropriate opening configuration of the gate, having a different size for each of various lenses, can be checked by exchanging small parts, resulting in the small cost of the pilot production. Even in the case of the lens configuration having difference between the thicknesses of the central portion and the peripheral portion like the spectacle lens, this lens configuration does not have influence on molding the lens with a high power of precision.

And further, the void space as the lacked portion is not produced in the connection portion of the runner forming portion and the sprue forming portion of the lens molding, therefore, the coating process with the coating fluid and the washing process with the cleaning fluid as the after-treatment process can take place for the lens portion, because it is avoided to produce a disadvantage commercial value of the lens is damaged by staining the surface of the lens portion a white turbidity fluid caused by mixture of the coat fluid and the cleaning fluid.

What is claimed is:

1. A lens producing method for molding a desired lens molding by solidifying a thermoplastic molten resin in a lens cavity which is formed in an injection molding die for molding a lens, in which the lens molding is molded by using the injection molding die for molding the lens in the lens cavity and a gate is Provided in the injection molding die as an inlet port for the molten resin flowed into the lens cavity which is open towards the lens cavity, the improvement comprising the step of changing the shape of an opening configuration of the gate in response to the molding of a minus lens having a thicker peripheral portion than a central portion thereof and the molding of a plus lens having a thinner peripheral portion than a central portion thereof.

2. The lens producing method according to claim 1,
   wherein the lens molding is a spectacle lens having a meniscus-shape; and
   wherein an opening area of the gate for molding the minus lens is larger than the opening area of the gate for molding the plus lens.

3. The lens producing method according to claim 1, wherein:

the gate is provided therein with a gate top member and an inner face for determining the opening configuration of the gate, so that the gate opening configuration is formed by a space between the inner face of the gate and the gate top member; and the gate opening configuration is changed by changing at least one of a width, a gate angle, and a height of the gate top member.

4. A lens producing method for molding a desired lens molding by solidifying a thermoplastic molten resin in a molding lens cavity formed in an injection molding die for molding a lens, the lens molding being processed by washing with a cleaning fluid and coating with a coating fluid, comprising the steps of:

molding the lens molding by using the injection molding die for molding the lens provided therein with plural molding lens cavities in the injection molding die for molding a plurality of lenses, a plurality of gates that function as inlet ports for the molten resin flowed into the cavities, each gate opening into a separate one of the cavities, and a runner connecting the plural cavities through the gates and a sprue connected to the runner;

changing shapes of an opening configuration of the gates in response to the molding of a minus lens having a thicker peripheral portion than a central portion thereof and the molding of a plus lens having a thinner peripheral portion than a central portion thereof; and changing the volume of a connection portion of the runner and the sprue to be smaller in molding the plus lens than molding the minus lens.

5. The lens producing method according to claim 4,
   wherein the lens molding is a spectacle lens having a meniscus-shape; and
   wherein the openings of the gates for molding the minus lens are larger than the openings of the gates for molding the plus lens.

6. The lens producing method according to claim 4, wherein each gate is provided therein with a gate top member for determining the opening configuration of the gate, so that the gate opening configuration formed by a space between an inner face of the gate and the gate top member and the gate opening configuration is changed by changing at least one of a width, a gate angle, and a height of the gate top member.

7. The lens producing method according to claim 4, wherein the volume of the connection portion of the runner and the sprue is changed to be smaller in molding the plus lens than molding the minus lens by placing a projected top member at the side of the runner adjacent to the sprue.

8. An injection molding die for molding a lens in order to mold a lens molding made of a thermoplastic resin with a washing process by a cleaning fluid and a coating process by a coating fluid, comprising:

a plurality of lens molding cavities for molding a plurality of lens;

a plurality of gates, each said gate opening towards a separate one of said cavities;

a runner connecting said plural cavities; wherein said runner is connected to said cavities through said gates; and a sprue connected to said runner, wherein each said gate is provided therein with a gate top member for determining an opening configuration of said gate, each said gate top member being exchangeably placed in said gate, in which said gate top member is located and a connection portion of said runner and said sprue being provided therein with a projection protruding toward the inside of at least one of said runner and said sprue.

9. The injection molding die for molding the lens according to claim 8, wherein the lens molding is a spectacle lens having a meniscus-shape; and wherein said prepared plural gate top members each is different in at least one gate opening configuration determinant elements of width, gate angle and height from one another, the gate opening configuration determinant elements defining the shape of said gate opening configuration formed by a space between the inner face of said gate and said gate top member.

10. The injection molding die for molding the lens according to claim 8, further comprising a gate forming member opposing to at least one said gate top member, said gate forming member either having a notch portion formed on the face opposing to said gate top member or not, and being exchangeable.

11. The injection molding die for molding the lens according to claim 8, said projection is formed of a detachable projected top member.

12. A lens molding having plural lens portions molded in molding lens cavities in an injection molding die for molding a lens, a runner forming portion connecting the lens portions formed with a runner of the injection molding die for molding the lens, and a sprue forming portion connected to the runner forming portion formed with a sprue of the injection molding die for molding the lens, and undergoing a washing process with a cleaning fluid and a coating process with a coating fluid, wherein a pinch portion is formed to a connection portion of said runner forming portion and said sprue forming portion.

13. The lens molding according to claim 12, wherein said pinch portion is formed by decreasing a diameter of a side of said runner forming portion adjacent to said sprue forming portion.

14. The lens molding according to claim 12, wherein said lens portion molded in the cavity is a meniscus lens for a spectacle lens, the lens portion having a thicker central portion than a peripheral portion thereof.

15. An injection molding die assembly for molding a lens from thermoplastic resin, said assembly including:

a die unit having a cavity in which the thermoplastic resin is received and in which the thermoplastic resin is molded to form the lens; and a gate through which the thermoplastic resin is flowed into the cavity, wherein said die unit has opposed first and second face surfaces that define a height of the gate;

at least one insert disposed in the cavity that defines a surface of the lens to be molded; and a gate member releasably secured to said die unit against the first face surface in the gate, said gate member having a height less than the height of the gate so that the gate member and the second face surface of said die unit collectively define a gate opening through which the thermoplastic resin flows into the cavity.

16. The injection molding die assembly of claim 15, wherein said die unit has a runner through which the thermoplastic resin is injected and the gate is located between the runner and the cavity.

17. The injection molding die assembly of claim 15, wherein said at least one insert is releasably secured into the cavity and said at least one insert and said gate member are separate components.

18. The injection molding die assembly of claim 15, wherein the first face surface of said die unit is located below the second face surface of said die unit.

19. The injection molding die assembly of claim 15, wherein said gate member is releasably attached to said die unit by a threaded fastener.

20. The injection molding die assembly of claim 15, wherein: said die unit includes a stationary die and a movable die that is capable of movement towards and away from said stationary die; and said stationary die and said movable die, when abutting each other, collectively define the gate and the cavity.

21. The injection molding die assembly of claim 20, wherein the first face surface of said die unit is formed by a surface of said stationary die and said gate member is secured to said stationary die.

22. The injection molding die assembly of claim 20, wherein said movable die includes a guide member opposite said gate member that is spaced from said gate member, said guide member defining the second face surface of said die unit and being releasably secured to said movable die.

23. The injection molding die assembly of claim 15, wherein:

the die unit cavity and said at least one insert are formed so that said die unit is configured to mold a spectacle lens having a meniscus shape;

said gate member is formed to have a first face that is directed away from the cavity and a second face that is directed towards the cavity, said first and second faces subtending planes that intersect at a specific gate angle and a specific height; and said gate member is selected from one of a set of a plurality of gate members wherein the gate members of said set are formed to have different heights or gate angles from each other.

24. The injection molding die assembly of claim 15, further including a guide member that is releasably secured to said die unit and is located opposite said gate member wherein said guide member forms the second face surface of said die unit and said guide member is one from a set of a plurality of guide members, at least one of the guide members of said set being formed to define a notch, so that when the notch-defining guiding member is secured to said die unit, the notch is part of the gate opening into said cavity.

* * * * *

UNITED STATES PATENT AND TRADEMARK OFFICE
CERTIFICATE OF CORRECTION

PATENT NO. : 6,210,610 B1
DATED : April 3, 2001
INVENTOR(S) : Kiyohiro Saito and Hiroshi Asami It is certified that error appears in the above-identified patent and that said Letters Patent is hereby corrected as shown below:

Column 8,
Line 34, "opened toward" should read -- immediately adjacent to and open towards --.

Column 13,
Line 50, prior to "...in which the lens molding is molded by...", remove the "," (comma);
Line 52, change "Provided" to -- provided --;
Line 54, "which is open towards" should read -- , the gate opening directly into --.

Column 14,
Line 1, between "top member" and "and", insert -- that is releasably secured to the injection molding die --;
Line 16, "provided therein with" should read -- wherein the injection molding has: --.
Line 17, remove "in the injection molding die";
Line 18, change the ", " (comma) between "lenses" and "a" to -- ; -- (semicolon);
Line 20, insert -- directly -- between "opening" and "into";
Line 21, remove ", and" and insert -- ; -- (semicolon);
Line 22, insert -- ; -- (semicolon) between "gates" and "and";
Line 50, "the" in "the side" should read -- a --;
Line 54, after "comprising", insert -- at least one die, said at least one die shaped to have --;
Line 56, "lens" (occurrence right before semicolon) should read -- lenses --;
Line 57, "towards" should read -- directly into --;
Line 58, insert -- lens molding -- between "said" and "cavities";
Line 59, after ". . .said plural cavities...", change ";" (semicolon) to -- , -- (comma);
Line 67, remove the "," (comma) between "gate" and "in".

Column 15,
Line 7, insert -- shaped to define -- between "molding is" and "a";
Line 9, remove "prepared";
Line 14, change "the" in "between the inner" to -- an --;
Line 21, "exchangeable" should read -- exchangeably secured in said gate --;

UNITED STATES PATENT AND TRADEMARK OFFICE
CERTIFICATE OF CORRECTION

PATENT NO.   : 6,210,610 B1
DATED        : April 3, 2001
INVENTOR(S)  : Kiyohiro Saito and Hiroshi Asami It is certified that error appears in the above-identified patent and that said Letters Patent is hereby corrected as shown below:

<u>Column 15, cont'd,</u>
Line 33, beginning at "a pinch portion", delete the text to and including "sprue forming portion" in line 35, and insert -- pinch portions are formed in said lens molding, each said pinch portion being located between said sprue forming portion and said runner forming portion --;
Line 36, insert -- each -- between "wherein" and "said";
Line 46, insert -- : -- (colon) between "unit having" and "a cavity";
Line 48, insert -- immediately adjacent the cavity -- between "a gate" and "through".

Signed and Sealed this

Sixth Day of July, 2004

JON W. DUDAS
*Acting Director of the United States Patent and Trademark Office*

(12) EX PARTE REEXAMINATION CERTIFICATE (5470th)
United States Patent
Saito et al.

(10) Number: US 6,210,610 C1
(45) Certificate Issued: Aug. 8, 2006

(54) METHOD OF MANUFACTURING LENS, INJECTION MOLD FOR MOLDING OF LENS, AND MOLDED LENS

(75) Inventors: Kiyohiro Saito, Tokyo (JP); Hiroshi Asami, Tokyo (JP)

(73) Assignee: Hoya Corporation, Tokyo (JP)

Reexamination Request:
No. 90/007,368, Dec. 3, 2004

Reexamination Certificate for:
Patent No.: 6,210,610
Issued: Apr. 3, 2001
Appl. No.: 09/101,945
Filed: Jul. 17, 1998

Certificate of Correction issued Jul. 6, 2004.

(22) PCT Filed: Jan. 17, 1997
(86) PCT No.: PCT/JP97/00078
§ 371 (c)(1),
(2), (4) Date: Jul. 17, 1998
(87) PCT Pub. No.: WO97/26124
PCT Pub. Date: Jul. 24, 1997

(30) Foreign Application Priority Data
Jan. 18, 1996 (JP) ............................................. 8-006407
Feb. 22, 1996 (JP) ............................................. 8-034749

(51) Int. Cl.
*B29D 11/00* (2006.01)

(52) U.S. Cl. ...................... 264/2.2; 264/328.7; 425/808
(58) Field of Classification Search ....................... None
See application file for complete search history.

(56) References Cited

U.S. PATENT DOCUMENTS

| | | | |
|---|---|---|---|
| 4,664,854 A | 5/1987 | Bakalar | |
| 4,778,632 A | 10/1988 | Bakalar | |
| 6,210,610 B1 | 4/2001 | Saito et al. | |

*Primary Examiner*—Kiley Stoner

(57) ABSTRACT

A gate top member 23 is placed to a gate 22 opened toward the circumferential edge of a molding spectacle-lens cavity 13 formed between inserts 11 and 12. The plural gate top members 23 each having a different height are previously prepared, and attached with a bolt to be exchanged. In pilot production, it is checked for each of various lenses which opening configuration of the gate 22 can form a spectacle lens with defined great-precision by exchanging the gate top member 23 in order to obtain each gate opening configuration changed by exchanging the gate top member 23.

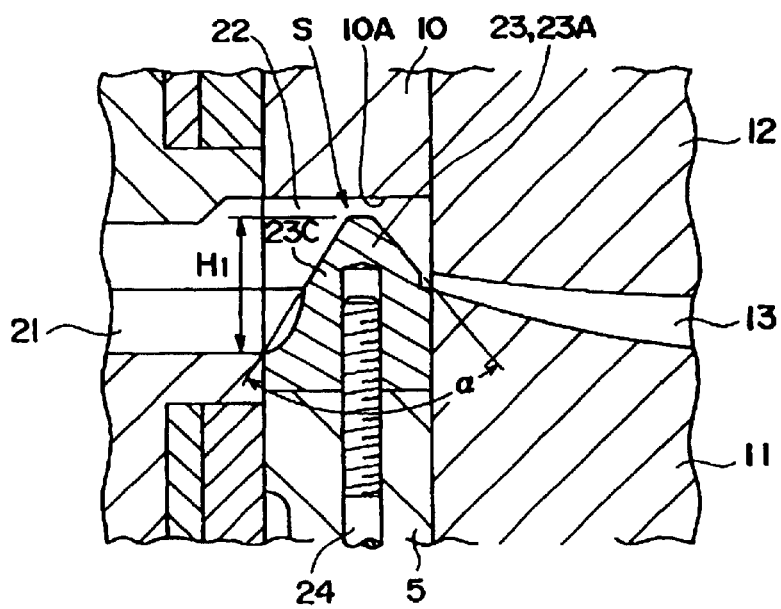

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–24 is confirmed.

* * * * *